Nov. 28, 1933.    T. BARTHOLOMEW    1,937,187
APPARATUS FOR TREATING SLAG
Filed Feb. 27, 1930    2 Sheets-Sheet 1
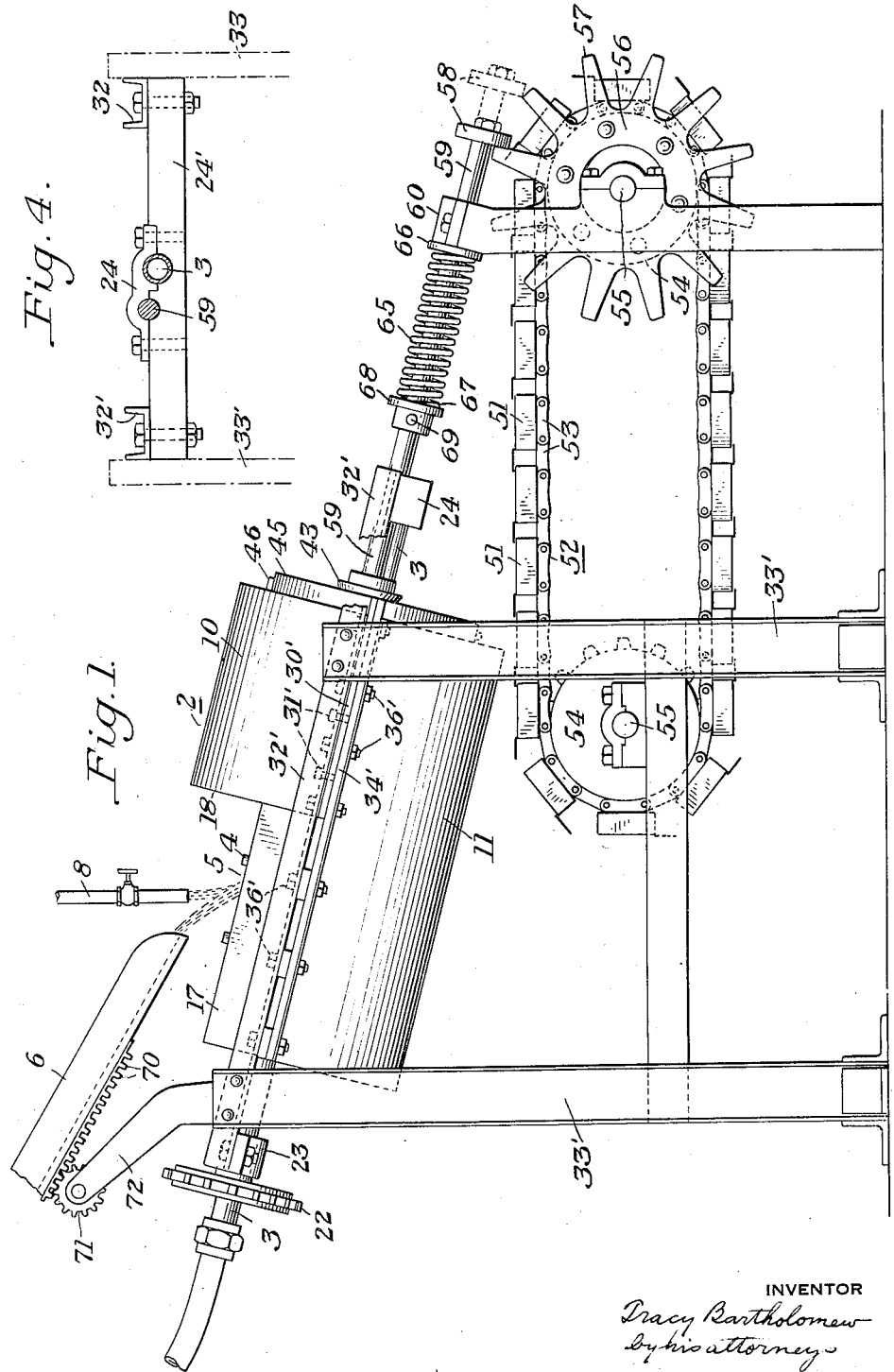
INVENTOR
Tracy Bartholomew
by his attorneys
Byrnes, Stebbins, Parmelee & Blenko

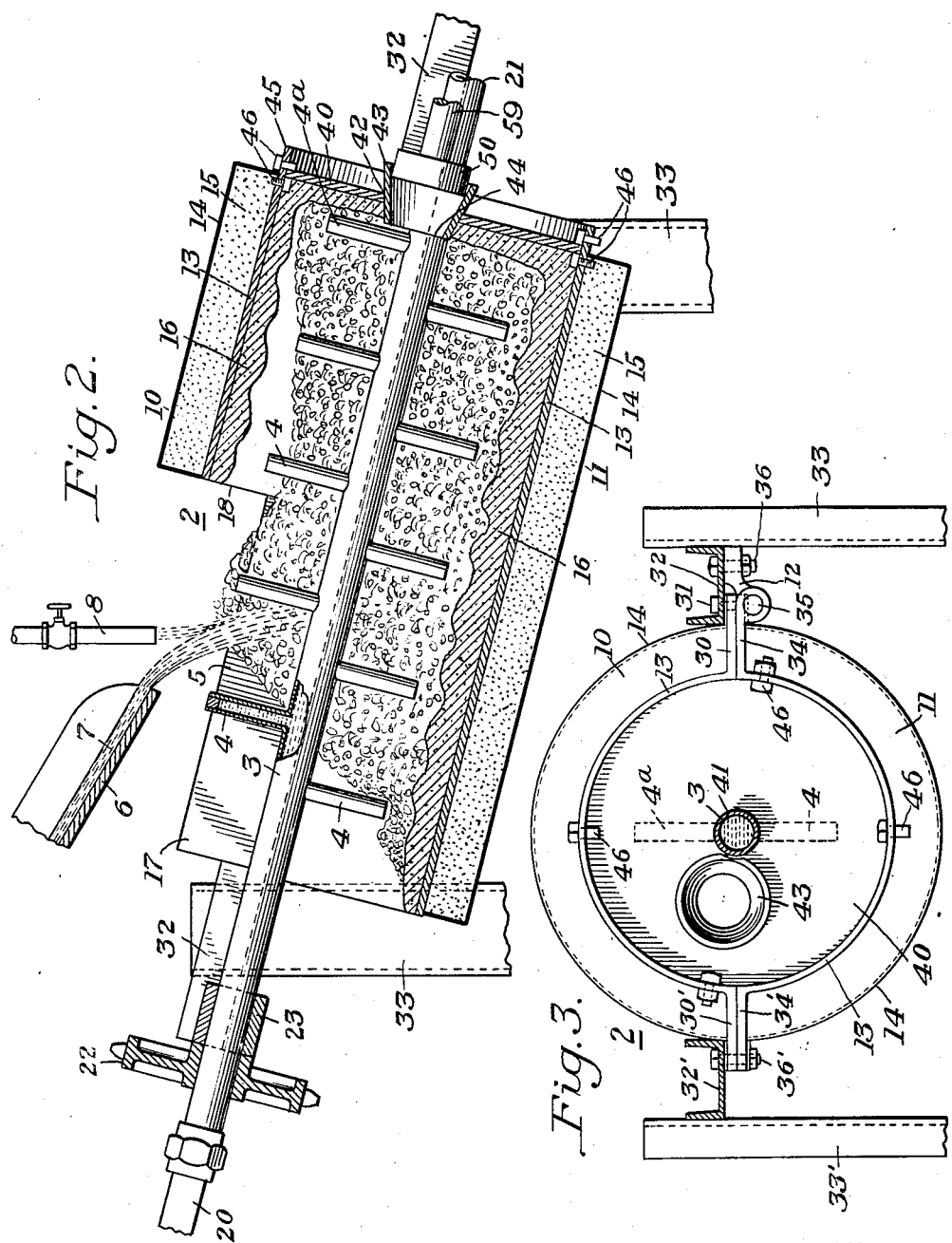

Patented Nov. 28, 1933

1,937,187

UNITED STATES PATENT OFFICE 1,937,187

APPARATUS FOR TREATING SLAG

Tracy Bartholomew, Pittsburgh, Pa.

Application February 27, 1930, Serial No. 431,718, and in Norway February 27, 1929

7 Claims. (Cl. 49—77.5)

This invention relates generally to apparatus for treating slag, and more particularly to apparatus for treating slag to render it porous or cellular and having such characteristics as to render it suitable for the production of building blocks, bricks or crushed slag for structural purposes.

It has been proposed heretofore to treat slag in a substantially vertical container provided with a vertically extending stirrer. Such an arrangement is described in Patent No. 1,458,858 granted June 12, 1923 to Mathias Ovrom Sem. The present invention constitutes an improvement in apparatus heretofore known. According to the Sem patent above referred to, the molten slag is introduced into the bottom of the cylindrical container and water is injected directly into the slag in the container. The water is vaporized, forming steam, and the mixture of slag and water is stirred to produce foam. The foam so produced rises in the container and passes out through an outlet opening at the top of the container. The foam flowing from the outlet opening may be passed through cooling rollers and then fed into molds, or it may be crushed. The container is lined with brick or other refractory material to decrease the loss of heat and to keep the slag molten.

Where an apparatus of the type referred to is employed, if for any reason the input of slag ceases, the slag in the bottom of the container freezes, thereby necessitating cleaning out the container before operation can be resumed. Since the container is lined with brick, it is very difficult to remove the frozen slag without also removing the brick lining.

It was previously believed necessary to keep the foam which had already been produced separate from the incoming untreated slag. I have found, however, that water may be mixed with slag either prior to or simultaneously with the introduction of the slag into the foaming apparatus. This results in better control of the amount of water added to the slag and accordingly results in a more uniform product.

In accordance with the present invention, the foaming apparatus is inclined to the horizontal and is provided with a stirrer which extends longitudinally of the container. The slag is introduced into the container at the upper end and flows through the container and out of the outlet opening adjacent the lower end of the container. The container is split longitudinally into a plurality of parts which are hinged together so that if it becomes necessary the parts may be swung apart and the apparatus cleaned. The walls of the container contact directly with the slag which is being treated, which causes a layer of slag to freeze thereon to act as a protective medium. Heat insulating material is provided outside of the wall to regulate the thickness of solidified slag.

In the accompanying drawings which illustrate the present preferred embodiment of my invention:

Figure 1 is a side elevation of the whole apparatus;

Figure 2 is a longitudinal section through the foaming apparatus;

Figure 3 is an end elevation of the foaming apparatus and;

Figure 4 is a detail showing the bearing for the stirrer shaft and the shaft of the plug which closes the outlet opening.

Referring more particularly to the accompanying drawings, the slag is treated in a substantially cylindrical container indicated generally by the reference numeral 2 and provided with a stirrer 3 having arms 4 which agitate the slag. The container is inclined to the horizontal and the stirrer extends axially thereof. The slag is introduced into the container through an inlet opening 5 from a runner 6 to which a stream 7 of slag is fed from a container not shown. Water from a pipe 8 may be added to the stream of slag prior to introduction of the slag into the container, or the slag and water may be added separately. The apparatus is also adapted for treating slag to which no water is added, the foaming action depending upon the stirring action and the liberation of gases present in the slag. Blast furnace slags, for example, which have been formed under the pressure present in the blast furnace, contain gases which are evolved when the slag becomes cool and therefore supersaturated with the gases. These gases are liberated when stirred so that such a slag may be used to form porous products without the addition of any water.

The container is split longitudinally into an upper part 10 and a lower part 11 which are connected by a hinge 12. The upper part 10 and the lower part 11 are semi-cylindrical in shape, the upper part 10 being of less length than the lower part 11. Each of the parts 10 and 11 has an inner wall 13 and an outer wall 14 spaced therefrom. The space between the inner and outer walls contains heat insulating material 15 such as Silocel. The inner wall 13 is made of metal, preferably an alloy steel which will withstand high temperatures. The slag treated in the container solidifies to a certain depth to form a layer 16 which acts as a protective coating for the inner wall 13. Plates 17 are secured to the semi-cylindrical lower part 11 and extend between the left hand end 18 of the upper part 10 and the left hand end of the container. These plates are provided for the purpose of preventing the foam produced in the container from overflowing.

The stirrer shaft 3 and the arms 4 are made hollow and are supplied with water for cooling, the water entering the lower end 21 and leaving the upper end 20 of the shaft. The stirrer is rotated through a sprocket wheel 22, which may be rotated by any desired means. The stirrer is supported by bearings 23 and 24 at opposite ends of the container.

Figure 3 illustrates the manner in which the container parts are hinged so that the container may be readily opened up for cleaning. The inner wall 13 of the upper part 10 of the container has a horizontal flange 30 which extends outwardly beyond the outer wall 14 and is fastened by screws 31 to a channel iron 32 which extends beyond the ends of the container and is supported by legs 33. The lower part 11 has a horizontal flange 34 pivoted on pins 35 carried by hinges 12 and secured to the channel iron 32 by bolts 36.

The flanges 30' and 34' at the left hand side of the container, as viewed in Figure 3, are secured by bolts 36' to a channel iron 32' supported by legs 33'. Screws 31' (Figure 1) are arranged between the bolts 36' to connect the flange 30' and the channel 32' when the lower part 11 is swung open for cleaning. The channels 32 and 32' extend beyond the ends of the container 2 and support the bearings 23 and 24. The channels are supported by legs 33 and 33'.

The lower end of the container 2 is partially closed by a plate 40 which is provided with an opening 41 through which the stirrer shaft 3 extends, and also with an opening 42 in which is inserted a cone 43 which forms the outlet for the foam produced in the container 2. The inner end 44 of the cone extends into the container to a point which is close to the arm 4a in order that the arm upon rotation will keep the outlet opening from choking. The plate 40 fits within an extension 45 of the inner wall 13 and is maintained in position by bolts 46.

The flow of slag from the outlet opening 42 is controlled by a plug 50 which fits into the cone 43. The plug is opened and closed intermittently by the arrangement shown in Figure 1, or any other arrangement for synchronizing the discharge of the foamer with feeding of successive molds. The slag flowing from the outlet opening 42 flows into molds 51 supported on a continuous conveyor 52. The chains 53 of the conveyor pass around sprocket wheels 54 secured to shafts 55 which may be rotated by any desired means. The right hand shaft 55, as viewed in Figure 1, carries a wheel 56 having arms 57. The arms 57 are adapted to contact with a disc 58 secured to the plug shaft 59 of the plug 50 which regulates the flow of slag from the container. The shaft 59 is mounted in a bearing 60, and a bearing 24 carried by a beam 24' fastened to the channels 32 and 32'. The shaft is normally held in the position indicated in Figure 1 by a spring 65 which surrounds the shaft and abuts at its lower end against a collar 66 secured to the bearing 60. The upper end 67 of the spring bears against a collar 68 which is secured to the shaft 59 by a pin 69. The shaft 59 is slidable in the bearing 60.

The point of feed of the slag into the container 2 may be varied to change the effective length of the stirrer. As shown in Figure 1, the runner 6 is provided with a rack 70 which is actuated by a pinion 71 carried by an arm 72 on the leg 33'. Rotation of the pinion 71 causes the runner 6 to be moved toward or away from the container 2, thereby decreasing or increasing the effective length of the stirrer.

In treating slag in the above described apparatus, slag and water or slag alone is fed from the runner 6 through the inlet opening 5. It flows through the apparatus and is agitated by the stirring arms 4 to produce a foam. The foam flows out of the outlet opening 42 which is always maintained clear due to the proximity of the arm 4a and the inner end of the cone 43. The opening 42 is intermittently opened and closed in synchronism with the passage of the molds 51 below the outlet opening. As the conveyor for the molds is operated, one of the arms 57 contacts with the disc 58 on the end of the plug shaft 59. Further rotation of the arm 57 moves the plug shaft and disc to the position indicated by the dotted lines in Figure 1. The spring 65 is compressed and the plug 50 withdrawn from the cone 43. As soon as the disc 58 reaches the dotted line position, the arm 57 is released from the disc and the spring 65 closes the opening 42. By this arrangement the plug 50 is moved intermittently into and out of the cone 43 in synchronism with the movement of the molds past the outlet opening.

My apparatus is so constructed that even if the inflow of slag ceases temporarily, the slag in the container 2 will not freeze up, thereby necessitating stopping operations until the container has been cleaned. If the input of slag stops, the stirrer is kept on rotating, thereby discharging the slag in the container through the outlet opening. This is a great advantage over prior art constructions in which if the flow of slag at the inlet end of the container stopped, the slag in the container froze, necessitating stopping operation of the apparatus. The inclined position of the container results in a thorough stirring operation, thereby producing slag of substantially uniform porosity. As compared with the horizontal or the vertical foamer, the inclined foamer is very much easier to keep open at the inlet end where both of the others tend to choke. With the inclined foamer no end plate is necessary at the feed end as is required in the horizontal foamer so that any loose material tends to be discharged automatically. In the vertical foamer, any loose material at the inlet end tends to bridge across the opening and prevent the entrance of fresh slag.

The discharge end is also much simpler to keep open in the inclined machine for reasons which will be quite evident. The inclination of the axis, furthermore, permits the retention within the foamer proper of a very considerable quantity of molten material so that the product as discharged is surprisingly uniform in quantity even when the material entering the foamer is quite irregular in quantity. For instance, with the inclined foamer it is possible to continue discharging material for some time after the feed to the foamer has been entirely discontinued and short stoppages of the feed make practically no difference in the quantity of the material discharged.

The product discharged by the inclined foamer is also much more uniform in quality than that discharged by either of the other types even when rather hard chunks enter with the feed. These chunks are readily melted upon contact with a considerable quantity of liquid slag held within the foamer and make no change at all in the quality of the material discharged. On the other hand, the inclined is not any harder to clean than the horizontal foamer and much easier than the vertical foamer. As a matter of fact, none of these foamers will clean themselves completely when the feed is long discontinued as the slag which solidifies against the walls can only be removed by opening the foamer and cracking it loose.

Aside from other uses set forth, this invention is designed and effective for the admixture of various materials to molten slag to change its composition and physical characteristics. The pipe 8 may serve as a means for introducing such material to the slag while it is being treated.

The apparatus above described is intended particularly for the treatment of slag from blast furnaces. However, other slags may be employed, either natural furnace slags or artificially prepared slags, and it is therefore to be understood that the term "slag" is intended as a term of general definition and not of limitation, and to include various materials which may be artificially made and which have the general characteristics of slag.

I have illustrated and described the present preferred form of my invention. It is to be understood, however, that the invention may be otherwise embodied within the scope of the following claims.

I claim:

1. Apparatus for treating molten slag, which comprises a substantially cylindrical metallic container having insulation on its exterior to prevent excessive building up of solidified slag, a stirrer extending axially of the container, and means for rotating the stirrer.

2. Apparatus for treating molten slag, which comprises a substantially cylindrical container, an inner metallic wall and an outer wall spaced therefrom, heat insulating material between the walls, the container being inclined to the horizontal, a stirrer extending longitudinally of the container and means for rotating the stirrer.

3. Apparatus for treating molten slag, which comprises a substantially cylindrical container having inner and outer metallic walls spaced from each other, heat insulating material between the walls, the container being inclined to the horizontal, a stirrer extending longitudinally of the container, and means for rotating the stirrer.

4. Apparatus for treating molten slag, which comprises a container inclined to the horizontal and having an inlet opening and an outlet opening, a stirrer extending axially of the container, means for rotating the stirrer, means for feeding slag into the container through the inlet opening, and means for varying the point of feed to control the effective length of the stirrer.

5. Apparatus for treating molten slag, which comprises a container inclined to the horizontal and having an inlet opening at its upper end and a discharge opening at its lower end, means for feeding a stream of slag into the container through the inlet opening, the inlet opening being several times larger than the stream, the means for feeding the stream being adjustable to regulate the point of feeding in order to vary the effective length of the stirrer.

6. Apparatus for treating molten slag, which comprises a container having an inner metallic wall and an outer wall spaced therefrom, heat insulating material between the walls, the container being inclined to the horizontal, a stirrer extending longitudinally of the container, and means for rotating the stirrer.

7. Apparatus for treating molten slag, which comprises a container inclined to the horizontal, a stirrer extending longitudinally of the container, means for rotating the stirrer, means for supplying molten slag to the container, a pipe arranged to supply water adjacent the top of the container, the top of the container adjacent the point of supply of the water to the molten slag being open in order to prevent clogging of the apparatus due to any solid slag which may form.

TRACY BARTHOLOMEW.